US012697776B2

(12) United States Patent
Sicre

(10) Patent No.: US 12,697,776 B2
(45) Date of Patent: Aug. 4, 2026

(54) DEVICE FOR DEPOSITING MATERIAL IN THE FORM OF WIRE COMPRISING AT LEAST ONE WIRE SPOOL AND AT LEAST ONE SYSTEM INDICATING THE FILLING LEVEL OF THE SPOOL

(71) Applicant: Airbus Operations SAS, Toulouse (FR)

(72) Inventor: Matthieu Sicre, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 682 days.

(21) Appl. No.: 18/329,637

(22) Filed: Jun. 6, 2023

(65) Prior Publication Data

US 2023/0390854 A1 Dec. 7, 2023

(30) Foreign Application Priority Data

Jun. 7, 2022 (FR) ...................................... 2205421

(51) Int. Cl.
| | |
|---|---|
| *B29C 64/321* | (2017.01) |
| *B33Y 30/00* | (2015.01) |
| *B65H 49/32* | (2006.01) |
| *B65H 63/08* | (2006.01) |

(52) U.S. Cl.
CPC ............ *B29C 64/321* (2017.08); *B33Y 30/00* (2014.12); *B65H 49/32* (2013.01); *B65H 63/08* (2013.01); *B65H 2701/36* (2013.01)

(58) Field of Classification Search
CPC ...... B65H 63/08; B65H 63/082; B29C 64/321
See application file for complete search history.

(56) References Cited

U.S. PATENT DOCUMENTS

| | | |
|---|---|---|
| 2015/0027239 A1 | 1/2015 | Konkle |
| 2020/0246891 A1 | 8/2020 | Mehlman et al. |
| 2021/0370431 A1 | 12/2021 | Brown |

FOREIGN PATENT DOCUMENTS

| | | | | |
|---|---|---|---|---|
| CN | 107444976 A | * 12/2017 | ......... | B65H 67/0405 |
| CN | 110155811 A | 8/2019 | | |
| DE | 202014105812 U1 | 11/2015 | | |
| EP | 3693116 A1 | 8/2020 | | |
| EP | 3919214 A1 | 12/2021 | | |
| FR | 2432157 A3 | 2/1980 | | |
| JP | H07102428 A | * 4/1995 | ........... | B65H 63/082 |

OTHER PUBLICATIONS

French Search Report for corresponding French Patent Application No. 2205421 dated Jan. 12, 2023; priority document.

* cited by examiner

*Primary Examiner* — Atul P. Khare

(74) *Attorney, Agent, or Firm* — Greer, Burns & Crain, Ltd.

(57) ABSTRACT

A device for depositing material in the form of wire including a coil of wire configured to pivot around an axis of rotation as well as at least one indication system including a support, at least one rod oriented in a direction secant to the axis of rotation, a pad connected to the first end of the rod and configured to bear against a wire wound on the coil of wire, a sliding link configured to allow the rod to translate in the secant direction, as well as a return element configured to translate the rod in the direction of the axis of rotation, the rod occupying a position according to a level of filling the coil. This solution makes it possible to obtain a passive type indication system.

11 Claims, 8 Drawing Sheets

1

DEVICE FOR DEPOSITING MATERIAL IN THE FORM OF WIRE COMPRISING AT LEAST ONE WIRE SPOOL AND AT LEAST ONE SYSTEM INDICATING THE FILLING LEVEL OF THE SPOOL

CROSS-REFERENCES TO RELATED APPLICATIONS

This application claims the benefit of the French patent application No. 2205421 filed on Jun. 7, 2022, the entire disclosures of which are incorporated herein by way of reference.

FIELD OF THE INVENTION

This application relates to a device for depositing material in the form of wire comprising at least one wire spool and at least one system for indicating the filling level of the spool.

BACKGROUND OF THE INVENTION

According to one manufacturing technique, a part is produced using additive manufacturing by layering layers of material obtained by fusing a material using a directed energy source, such as a laser beam or an electron beam, for example. According to a technique known as Directed Energy Deposition (also referred to as DED), the material in the form of wire is deposited simultaneously with the application of energy.

According to one embodiment, a depositing device comprises a structure, a depositing head supported by the structure and at least one wire spool mounted such that it pivots about a horizontal rotational axis, integral with the structure, and configured to supply wire to the deposition head. According to one configuration, the wire spool comprises a barrel on which the wire is wound and also two flanges positioned at each end of the barrel, between which the wire is wound. According to one arrangement, the wire spool is covered by a hood although the wire level cannot be directly seen by an operator. In order for the filling level of the spool to be indicated, the spool may be equipped with an electrical or electronic sensor, such as a magnetic or inductive sensor, for example, which is suitably positioned on the spool in order to indicate the absence of wire at a certain level. This embodiment is not entirely satisfactory, as it requires an energy source in order to operate.

SUMMARY OF THE INVENTION

An object of this invention is to overcome some or all of the disadvantages of the prior art.

To this end, an object of the invention is a device for depositing material in the form of wire, comprising a structure, a depositing head supported by the structure, a wire spool configured to supply wire to the depositing head and to pivot about an axis of rotation, as well as at least one indication system configured to indicate a filling level of the wire spool.

According to the invention, the indication system comprises a support integral with the structure, at least one spindle extending between first and second ends in a second direction transverse to the rotational axis, a pad connected to the first end of the spindle and configured to bear against a wire wound onto the wire spool, a slide link configured to allow the spindle to be relocated in the second direction and also a restoring element configured to relocate the spindle in the direction of the rotational axis, the spindle occupying a position which depends on a filling level of the wire spool.

The invention allows a passive indication system to be obtained, which allows the filling level of a wire spool to be indicated without requiring electrical energy.

According to another characteristic, the indication system comprises at least a first moving index mark which is integral with the spindle and also a second fixed index mark, the first and second index marks occupying a relative position, depending on the filling level of the wire spool.

According to another characteristic, each slide link comprises a tube which is integral with the support, coaxial to the spindle and configured to house the restoring element, as well as at least one slide bearing which is integral with the tube and in which the spindle slides.

According to another characteristic, the second index mark is a light, at the level of the tube, which makes it possible to see a portion of the spindle on which the first index mark(s) is (are) placed from an area outside the tube.

According to another characteristic, the indication system comprises a unique first index mark positioned on the spindle, in such a manner as to be to the right of the light when the pad is in contact with the wire(s) wound onto the wire spool and the spool is at a low filling level.

According to another characteristic, the indication system comprises multiple first index marks distributed over the length of the spindle.

According to another characteristic, the first index marks are of different colors, depending on their position on the spindle.

According to another characteristic, the colors of the first index marks are determined in such a manner that the first index marks located to the right of the second index mark are:

in at least a first color when the pad is in contact with the wire(s) wound onto the wire spool and the spool is at a satisfactory filling level, in a second color, different from the first color, when the pad is in contact with the wire(s) wound onto the wire spool and the wire spool is at a low filling level.

According to another characteristic, the indication system comprises two parallel spindles as well as, for each spindle, a slide coupling and a restoring element.

According to another characteristic, the indication system comprises a crossbar linking the second ends of the two spindles.

According to another characteristic of the invention, the support comprises a coupling system for linking it to the structure of the device for depositing material in a detachable manner.

BRIEF DESCRIPTION OF THE DRAWINGS

Other characteristics and advantages will emerge from the description of the invention which follows, the description being provided simply by way of example, with regard to the attached drawings in which.

DETAILED DESCRIPTION OF THE PREFERRED EMBODIMENTS

Figure 1:
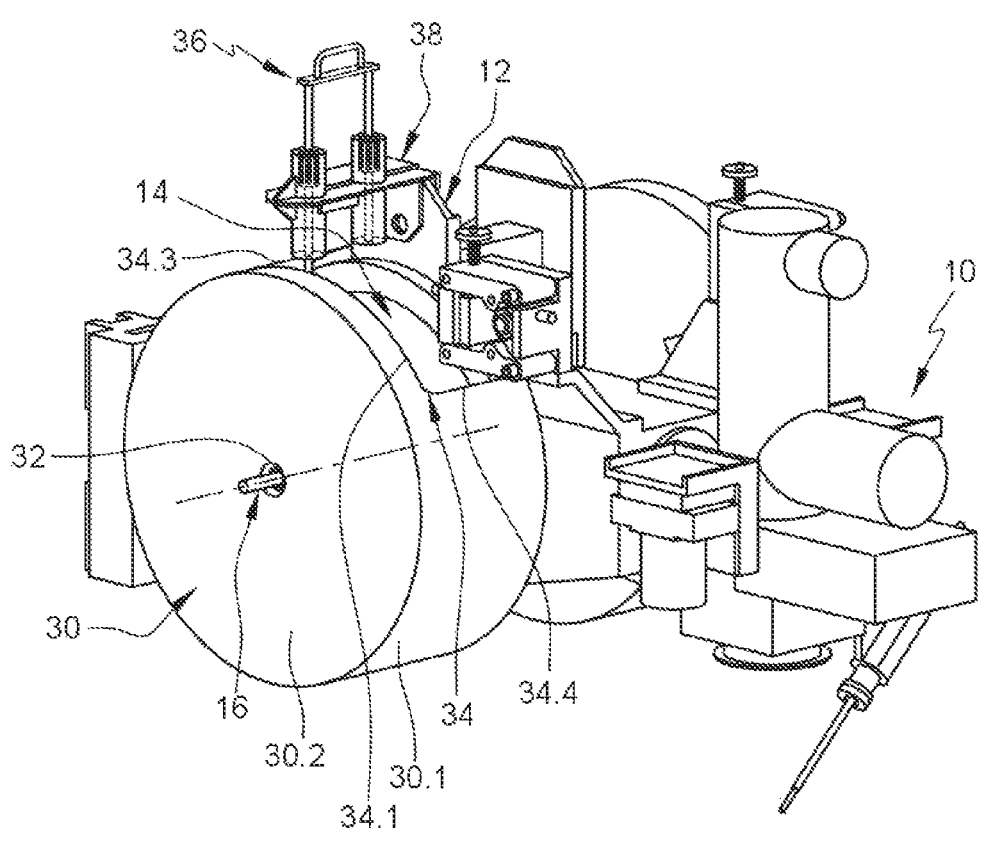
FIG. 1 is a perspective view of a device for depositing material in the form of wire, illustrating an embodiment of the invention.
Figure 2:
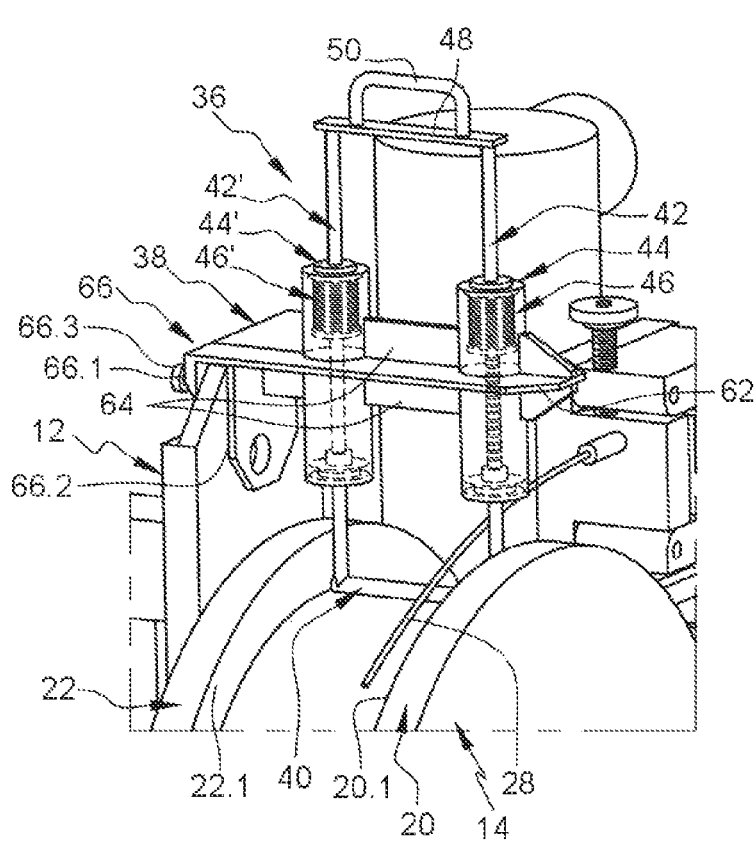
FIG. 2 is a perspective view of a section of a wire spool without hood and of an indication system of the filling level of the spool, illustrating an embodiment of the invention.

According to one embodiment that can be seen in FIG. 1, a device for depositing material in the form of wire allowing a technique known as Directed Energy Deposition (also referred to as DED) to be implemented comprises a depositing head 10, at least one structure 12 supporting the depositing head 10, and also at least one wire spool 14 configured to supply the depositing head 10 with wire and pivot about a rotational axis 16 connected to the structure 12 and parallel to a first direction. According to the configuration that can be seen in FIG. 1, the first direction is substantially horizontal.

Figure 3:
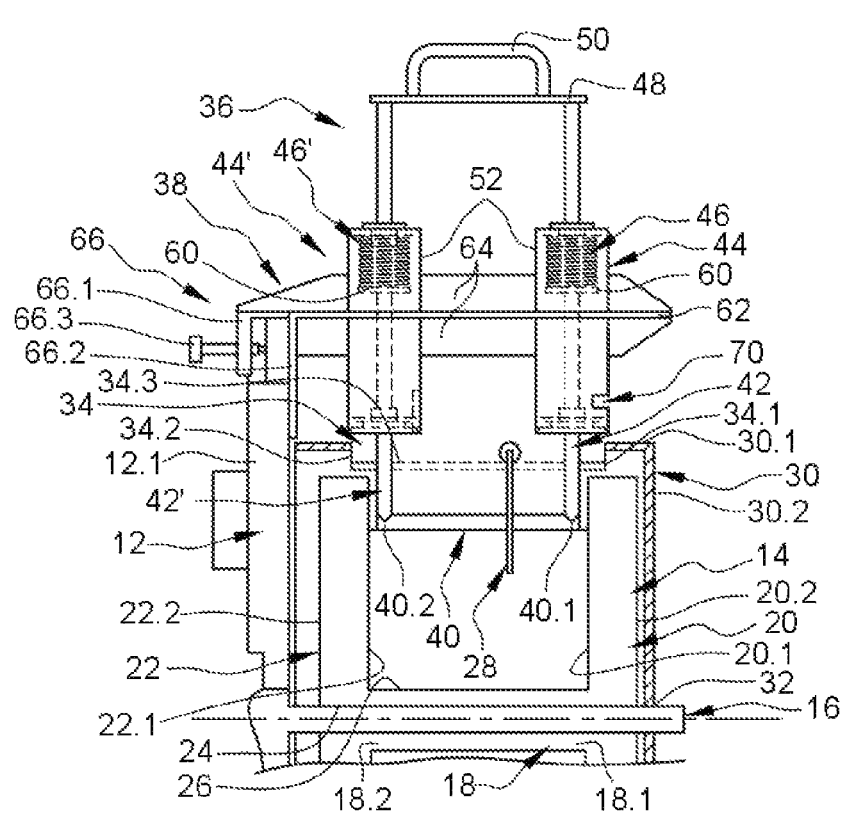
FIG. 3 is a front view of an indication system of the filling level of a spool, the spool being practically full, illustrating an embodiment of the invention.
Figure 4:
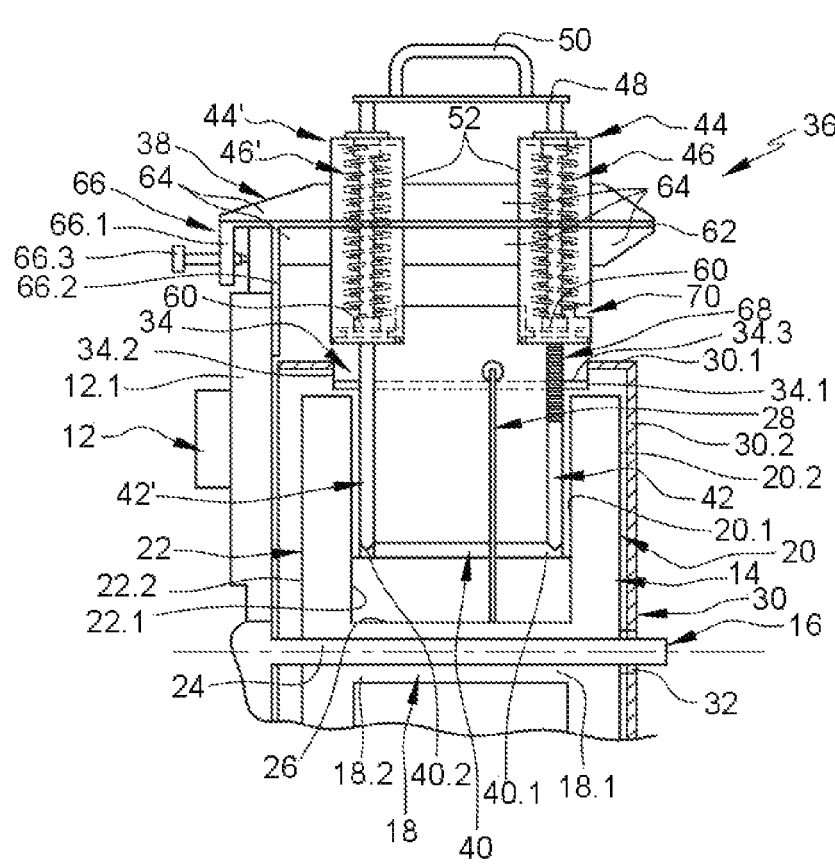
FIG. 4 is a front view of the indication system of the filling level of a spool that can be seen in FIG. 3, the spool being practically empty.

According to one embodiment that can be seen in FIGS. 3 and 4, the wire spool 14 comprises a barrel 18 which extends between first and second ends 18.1, 18.2, as well as two flanges 20, 22 positioned at each of the first and second ends 18.1, 18.2 of the barrel 18. The flanges 20, 22 comprise inner faces 20.1, 22.1 oriented towards one another and outer faces 20.2, 22.2 opposite the inner faces 22.1, the inner and outer faces 20.1, 20.2, 22.1, 22.2 being parallel to one another and positioned in planes which are perpendicular to the rotational axis 16 when the wire spool 14 is mounted on the rotational axis 16. The barrel 18 comprises a through hole 24, configured to house the rotational axis 16, which extends from one end to the other of the barrel 18 and opens out at the outer faces 22.2 of the flanges 20, 22. The barrel 18 likewise comprises a cylindrical surface 26, coaxial to the through hole 24, which extends between the inner faces 22.1 of the flanges 20, 22 and on which at least one wire 28 is wound. During operation, the barrel 18 of the wire spool 14 is mounted on the rotational axis 16.

In a manner known per se, the device for depositing material comprises a maintenance mechanism configured to maintain the wire spool 14 on the rotational axis 16 and to allow easy assembly and dismantling of the wire spool 14, as well as a hood 30 configured to cover the wire spool 14. This hood 30 comprises a cylindrical wall 30.1 and a transverse wall 30.2. The transverse wall comprises an orifice 32 to allow the rotational axis 16 to pass through. The cylindrical wall 30.1 comprises an opening 34 to allow the wire 28 to pass through, the opening being delimited by two first edges 34.1, 34.2 which are substantially parallel to one another and to the transverse wall 30.2 and separated by a distance greater than the width separating the two flanges 20, 22, as well as by two second edges 34.3, 34.4 (which can be seen in FIGS. 1, 3 and 4) parallel to one another and substantially perpendicular to the transverse wall 30.2.

The depositing head 10, the structure 12, the wire spool 14 and the hood 30 are not described further, as they will be known to the person skilled in the art and may be identical to those of the prior art.

The device for depositing material in the form of wire comprises at least one indication system 36 configured for indicating a filling level of the wire spool 14. This indication system 36 comprises a support 38 which is integral with the structure 12 of the depositing device, a pad 40 configured to bear against the wire 28 wound onto the wire spool 14, at least one spindle 42 to which the pad 40 is connected, a slide coupling 44 configured to allow the spindle 42 to be relocated in a second direction transverse to the first rotational axis 16, as well as a restoring element 46 configured to relocate the spindle 42 in the direction of the rotational axis 16. Hence, the position of the spindle 42 depends on the filling level of the wire spool 14.

According to one configuration, the support 38 is oriented roughly parallel to the rotational axis 16. In the case of a rotational axis 16 which is substantially horizontal, the support 38 is substantially horizontal and positioned above the wire spool 14.

Each spindle 42 is straight and extends between the first and second end in the second direction, the pad 40 being linked to the first end of the spindle 42.

According to one embodiment, the pad 40 is an elongate element which extends in a direction parallel to the rotational axis 16 between the first and second ends 40.1, 40.2. The pad 40 has a length (distance between its first and second ends 40.1, 40.2) substantially equal to, or very slightly smaller than, the distance separating the two flanges 20, 22. "Very slightly smaller" is understood to mean that the distance between the pad 40 and each of the flanges 20, 22 is smaller than the diameter of the wire 28.

According to one configuration, the pad 40 exists in the form of a cylindrical spindle which is substantially parallel to the rotational axis 16.

According to one arrangement, the indication system 36 comprises two parallel spindles 42, 42' as well as, for each spindle 42, 42', a slide coupling 44, 44' and a restoring element 46, 46'. The two spindles 42, 42' are positioned at the first and second ends 40.1, 40.2 of the pad 40 and in a plane containing the rotational axis 16.

According to one embodiment, the indication system 36 comprises a crossbar 48 linking the two spindles 42, 42'. According to one configuration, the pad 40 links the first ends of the two spindles 42, 42' and the crossbar 48 links the second ends of the two spindles 42, 42'.

The indication system 36 comprises a handle 50 which is integral with the crossbar 48, in order to allow the pad 40 to be moved away from the rotational axis 16 when restoring elements 46 are encountered.

According to one embodiment, each restoring element 46, 46' is a spiral compression spring.

Each slide coupling 44, 44' comprises a tube 52 which is integral with the support 38, coaxial to the corresponding spindle 42, 42' and configured to house the restoring element 46, 46'. According to one arrangement, the tube 52 extends on either side of the support 38. To the right of each tube 52, the support 38 comprises an opening 54 with a diameter substantially identical to the outer diameter of the tube 52.

According to one embodiment, each slide coupling 44, 44' comprises at least one slide bearing 56 integral with the tube 52, in which the corresponding spindle 42, 42' slides. According to one configuration, each slide coupling 44, 44' comprises two sliding pads 56, 56', one at each end of the tube 52. According to one arrangement, each tube 52 comprises a first transverse wall 58.1 at a first end (the furthest away from the rotational axis 16) and also a second transverse wall 58.2 at a second end, the first and second transverse walls 58.1, 58.2 being crossed by the corresponding spindle 42, 42' and supporting the slide bearings 56, 56'.

Each spindle 42, 42' comprises a collar 60 positioned in the tube 52, the restoring element 46, 46' being inserted between the first transverse wall 58.1 of the tube 52 and the collar 60. Hence, during operation, each restoring element 46, 46' pushes the corresponding spindle 42, 42' in the direction of the rotational axis 16 and the pad 40 against the wire(s) wound on the wire spool 14.

According to one embodiment, the support 38 comprises a core 62 in the form of a plate which is perpendicular to the second direction, and which extends in a plane parallel to the rotational axis 16 and comprises an opening 54 for each tube 52. The support 38 may comprise reinforcements in the shape of wings or ribs 64, which are substantially perpendicular to the core 62 and linked to the tubes 52.

The support 38 comprises a coupling system 66 to link it in a detachable manner to the structure 12 of the device for depositing material. According to one arrangement, the structure 12 comprises a plate 12.1 which is substantially vertical and perpendicular to the rotational axis 16. In addition, the coupling system 66 comprises first and second wings 66.1, 66.2 which are parallel to one another, substantially perpendicular to the core 62 and spaced at a distance greater than the thickness of the plate 12.1, as well as at least one screw 66.3 which is screwed on the first wing 66.1 and sticks the plate 12.1 on the second wing 66.2.

Of course, the invention is not limited to this embodiment for the coupling system 66.

In order to allow the position of the spindle(s) 42, 42', and therefore the filling level of the wire spool 14, to be determined, the indication system 36 comprises at least a first moving index mark 68, which is integral with at least one spindle 42, 42', and a second fixed index mark 70, which is integral with a fixed element of the indication system 36 as the support 38 or one of the tubes 52, the first and second index marks 68, 70 being positioned one in respect of the other, in such a manner that the first index mark 68 is moved to the right of the second index mark 70, the relative position of the first and second index marks 68, 70 depending on the filling level of the wire spool 14.

According to one configuration, only one spindle 42 comprises first index marks 68.

According to one embodiment, the indication system 36 comprises multiple first index marks 68 uniformly distributed over the length of the spindle 42, each first index mark 68 exhibiting the form of a circular mark surrounding the spindle 42. According to one embodiment, the first index marks 68 are in different colors, depending on their position on the spindle 42. Hence, at least a first index mark 68.1 close to the second end of the spindle 42 (the furthest away from the pad 40) is red and at least a second index mark 68.2 close to the first end of the spindle (the closest to the pad 40) is green. The spindle 42 may comprise at least a first orange index mark 68.3 between the first green and red index marks 68.1, 68.2.

According to one configuration, the second index mark 70 is a light 72 at the level of the tube 52 in which the spindle 42 is relocated, making it possible to visualize a portion of the spindle 42 on which the first index mark(s) 68 is/are placed, depending on the filling level of the wire spool 14, from an outside area of the tube 52. According to another configuration, the second index mark 70 is the end of the tube 52 closest to the rotational axis 16, the first index mark(s) only being visible below the tube 52.

Figure 5:
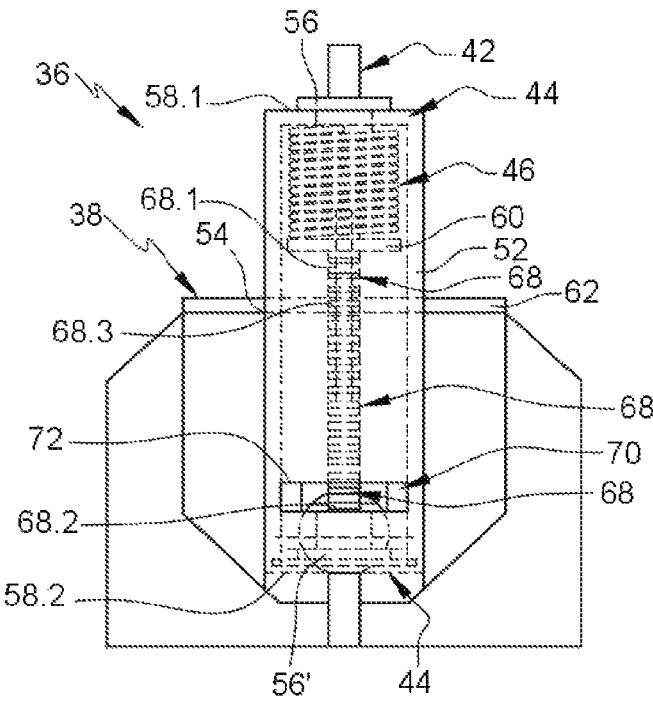
FIG. 5 is a side view of a section of the indication system of the filling level of a spool, illustrating a first variant, the spool being at a first filling level.
Figure 6:
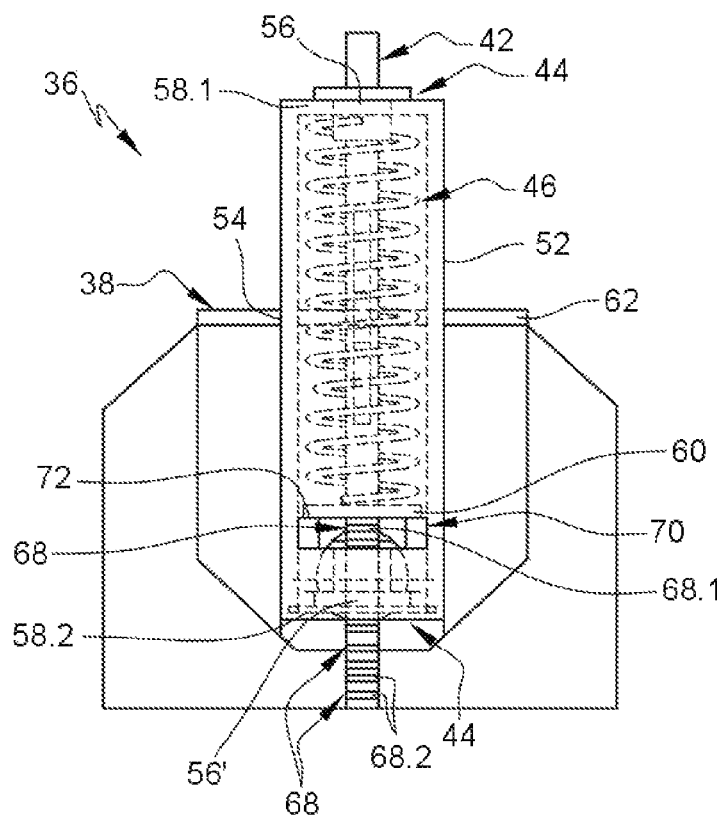
FIG. 6 is a side view of a section of the indication system of the filling level of a spool that can be seen in FIG. 5, the spool being at a second filling level.

The colors of the first index marks 68 are determined in such a manner that the first index marks 68 situated to the right of the second index mark 70 are in at least a first color when the pad 40 is in contact with the wire(s) wound onto the wire spool 14 and the wire spool is at a satisfactory filling level and does not need to be changed, or is in a second color which is different from the first color when the pad is in contact with the wire(s) wound onto the wire spool 14 and the wire spool is at a low filling level which needs to be changed. According to a first variant that can be seen in FIGS. 5 and 6, the first index marks 68 are positioned on the spindle 42, such that they are not visible below the tube 52 when the spool is at a maximum filling level (when it has just been changed), as illustrated in FIG. 5, and gradually appear below the tube 52 as the filling level of the spool diminishes, as illustrated in FIG. 6.

According to another variant, the first index marks 68 are positioned on the spindle 42, such that they are visible above the tube 52 when the spool is at a maximum filling level (when it has just been changed) and gradually disappear in the tube 52 as the filling level of the spool diminishes.

Figure 7:
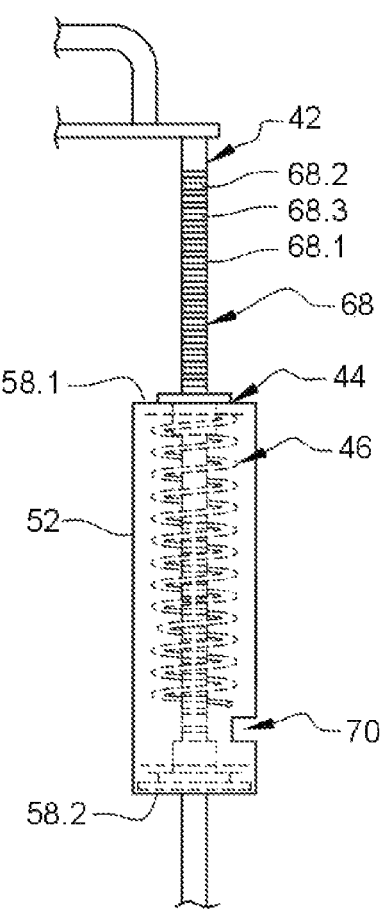
FIG. 7 is a side view of a section of the indication system of the filling level of a spool, illustrating a second variant, the spool being at a first filling level.
Figure 8:
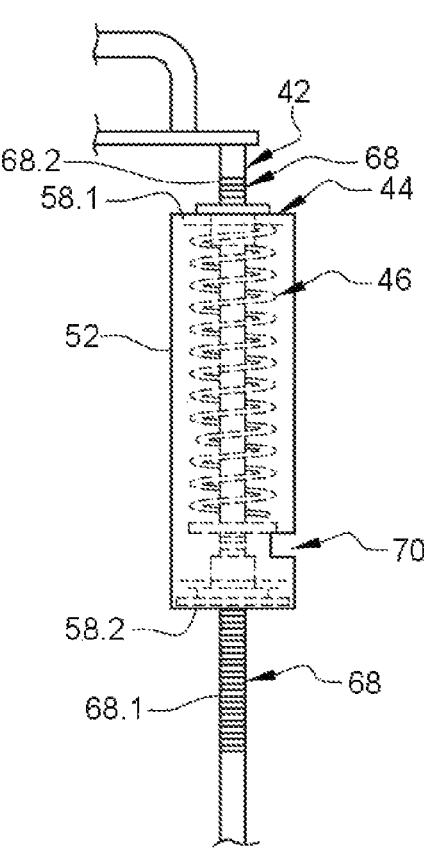
FIG. 8 is a side view of a section of the indication system of the filling level of a spool that can be seen in FIG. 7, the spool being at a second filling level.

According to another variant that can be seen in FIGS. 7 and 8, the first index marks 68 are positioned on the spindle 42, such that they are visible above the tube 52 and are not visible below the tube 52 when the spool is at a maximum filling level (when it has just been changed), as illustrated in FIG. 8, and gradually disappear in the tube 52 for those which are placed above the tube 52 and appear below the tube 52 as the filling level of the spool diminishes, as illustrated in FIG. 8.

According to another embodiment, the indication system 36 comprises a unique first index mark 68.1 positioned on the spindle 42, in such a manner as to be to the right of the light 72 when the pad is in contact with the wire(s) wound onto the wire spool 14 and the wire spool is at a low filling level meaning it needs to be changed.

The invention is of course not limited to these first and second index marks 68, 70 for the indication system 36.

The invention allows a robust, passive indication system 36 to be obtained, allowing the filling level of a wire spool to be indicated without the need for electrical energy.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for depositing material formed as a wire, comprising:

a structure, a depositing head supported by the structure, a wire spool configured to supply wire to the depositing head and to pivot about an axis of rotation, and at least one indication system configured to indicate a filling level of the wire spool;

wherein the indication system comprises:

a support integral with the structure, a spindle extending between first and second ends thereof in a second direction transverse to the axis of rotation, a pad connected to the first end of the spindle and configured to bear against a wire wound onto the wire spool, a slide link configured to allow the spindle to be relocated in the second direction, and a restoring element configured to relocate the spindle in a direction of the rotational axis, said spindle occupying a position which depends on a filling level of the wire spool.

2. The device for depositing material according to claim 1, wherein the indication system comprises at least a first moving index mark which is integral with the spindle and also a second fixed index mark, the first and second index marks occupying a relative position, depending on the filling level of the wire spool.

3. The device for depositing material according to claim 2, wherein the indication system further comprises a slide coupling, wherein the slide coupling comprises a tube which is integral with the support, coaxial to the spindle and configured to house the restoring element, as well as at least one slide bearing which is integral with the tube and in which the spindle slides, and wherein the second fixed index mark is a light, at a level of the tube, which makes it possible to see a portion of the spindle on which the first moving index mark is placed from an area outside the tube.

4. The device for depositing material according to claim 3, wherein the indication system further comprises a unique first index mark positioned on the spindle, in such a manner as to be to the right of the light when the pad is in contact with the wire wound onto the wire spool and said spool is at a low filling level.

5. The device for depositing material according to claim 2, wherein the indication system comprises the first index mark as one of multiple first index marks distributed over a length of the spindle.

6. The device for depositing material according to claim 5, wherein the multiple first index marks are of different colors, depending on a position of the multiple first index marks on the spindle.

7. The device for depositing material according to claim 6, wherein the colors of the multiple first index marks are determined in such a manner that the multiple first index marks located to a right of the second fixed index mark are:

in at least a first color when the pad is in contact with the wire wound onto the wire spool and said spool is at a satisfactory filling level, and in a second color, different from the first color, when the pad is in contact with the wire wound onto the wire spool and said wire spool is at a low filling level.

8. The device for depositing material according to claim 1, wherein the indication system further comprises a slide coupling, wherein the slide coupling comprises a tube which is integral with the support, coaxial to the spindle and configured to house the restoring element, as well as at least one slide bearing which is integral with the tube and in which the spindle slides.

9. The device for depositing material according to claim 1, wherein the restoring element is one of two restoring elements, wherein the indication system comprises the spindle as one of two parallel spindles, and for each of the parallel spindles, a slide coupling and a respective one of the restoring elements.

10. The device for depositing material according to claim 9, wherein the indication system comprises a crossbar linking the second ends of the two spindles.

11. The device for depositing material according to claim 1, wherein the support comprises a coupling system for linking the support to the structure of the device for depositing material in a detachable manner.

* * * * *